United States Patent
Chang et al.

(10) Patent No.: US 9,609,682 B2
(45) Date of Patent: Mar. 28, 2017

(54) COMMUNICATION CONTROL METHOD, USER TERMINAL, PROCESSOR, STORAGE MEDIUM, AND BASE STATION

(71) Applicant: KYOCERA CORPORATION, Kyoto (JP)

(72) Inventors: Henry Chang, San Diego, CA (US); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/399,851

(22) PCT Filed: May 9, 2013

(86) PCT No.: PCT/JP2013/063074
§ 371 (c)(1),
(2) Date: Nov. 7, 2014

(87) PCT Pub. No.: WO2103/168776
PCT Pub. Date: Nov. 14, 2013

(65) Prior Publication Data
US 2015/0103770 A1    Apr. 16, 2015

Related U.S. Application Data

(60) Provisional application No. 61/645,969, filed on May 11, 2012.

(51) Int. Cl.
*G01R 31/08* (2006.01)
*H04W 76/02* (2009.01)
(Continued)

(52) U.S. Cl.
CPC ......... *H04W 76/027* (2013.01); *H04L 41/069* (2013.01); *H04W 24/04* (2013.01);
(Continued)

(58) Field of Classification Search
USPC ..... 370/252, 216, 225, 329, 331; 455/456.1, 455/423, 411, 456.6, 501
See application file for complete search history.

(56) References Cited

U.S. PATENT DOCUMENTS 8,929,832 B2    1/2015 Jung et al.
9,100,858 B2 *  8/2015 Chang ................... H04W 24/04
                                                 455/423

(Continued)

FOREIGN PATENT DOCUMENTS

JP    2009-164882 A    7/2009
JP    2012-010340 A    1/2012
(Continued)

OTHER PUBLICATIONS

International Search Report; PCT/JP2013/063074; Aug. 6, 2013.
(Continued)

*Primary Examiner* — Phuongchau Ba Nguyen
(74) *Attorney, Agent, or Firm* — Studebaker & Brackett PC

(57) ABSTRACT

A communication control method applied to a mobile communication system including a user terminal capable of storing an MDT measurement log related to a radio environment measured based on an instruction from a network and a connection establishment failure log related to a failure of RRC connection establishment procedure with the network, the method includes the steps of: reserving a dedicated memory area for storing the connection establishment failure log, by the user terminal; and storing the connection establishment failure log in the dedicated memory area reserved in the reserving step, by the user terminal.

6 Claims, 12 Drawing Sheets

(51) Int. Cl.
*H04W 24/04* (2009.01)
*H04W 74/08* (2009.01)
*H04W 24/10* (2009.01)
*H04L 12/24* (2006.01)
*H04W 76/04* (2009.01)
*H04W 88/02* (2009.01)
*H04W 88/08* (2009.01)
*H04W 88/16* (2009.01)

(52) U.S. Cl.
CPC ....... *H04W 24/10* (2013.01); *H04W 74/0833* (2013.01); *H04W 76/028* (2013.01); *H04W 76/046* (2013.01); *H04W 88/02* (2013.01); *H04W 88/08* (2013.01); *H04W 88/16* (2013.01)

(56) References Cited

U.S. PATENT DOCUMENTS

| | | | |
|---|---|---|---|
| 9,445,261 B2 | 9/2016 | Yi et al. | |
| 2009/0046573 A1* | 2/2009 | Damnjanovic | H04W 36/30 370/216 |
| 2009/0257353 A1 | 10/2009 | Song et al. | |
| 2010/0130205 A1 | 5/2010 | Jung et al. | |
| 2011/0176430 A1 | 7/2011 | Zetterberg et al. | |
| 2011/0250880 A1* | 10/2011 | Olsson | H04W 24/10 455/423 |
| 2011/0312306 A1* | 12/2011 | Wu | H04W 24/10 455/414.1 |
| 2012/0039365 A1 | 2/2012 | Suzuki et al. | |
| 2012/0040621 A1 | 2/2012 | Jung et al. | |
| 2012/0276897 A1* | 11/2012 | Kwon | H04W 24/10 455/423 |
| 2013/0084910 A1* | 4/2013 | Suzuki | 455/515 |
| 2013/0189973 A1* | 7/2013 | Chang | H04W 24/04 455/423 |
| 2013/0303129 A1* | 11/2013 | Yi | H04W 12/02 455/411 |
| 2014/0023032 A1* | 1/2014 | Kim | H04W 72/085 370/329 |
| 2014/0050102 A1 | 2/2014 | Lee et al. | |
| 2015/0289311 A1* | 10/2015 | Chang | H04W 76/027 455/423 |

FOREIGN PATENT DOCUMENTS

| | | | |
|---|---|---|---|
| WO | 2012/047921 A1 | 4/2012 | |
| WO | WO 2012/148229 A2 * | 11/2012 | ............ H04W 24/10 |
| WO | 2012-0108657 A3 | 12/2012 | |

OTHER PUBLICATIONS

3GPP TSG-RAN WG2 #77bis; Ericsson et al.; "Accessiblity measurements for MDT"; Dresden, DE; Mar. 26-30, 2012; pp. 1-3; Tdoc R2-121605.

3GPP TS 37.320 V10.4.0 (Dec. 2011); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10); pp. 1-18.

An Office Action; "Notice of Reasons for Rejection," issued by the Japanese Patent Office on Aug. 25, 2015, which corresponds to Japanese Patent Application No. 2015-092500 and is related to U.S. Appl. No. 14/399,851; with English language statement of relevance.

Media Tek; "Introduction of MDT enhancements"; 3GPP; TSG-RAN WG2 Meeting #77bis; R2-121898; Mar. 25-30, 2012; Jeju, Korea.

The extended European search report issued by the European Patent Office on Mar. 15, 2016, which corresponds to European Patent Application No. 13787614.0-1857 and is related to U.S. Appl. No. 14/399,851.

Dffice Action dated Aug. 24, 2016 from corresponding US. Appl No. 15/211,850, 29 pp.

3GPP TR 36.805 V2.0.0 (Nov. 2009), 3rd Generation Partnership Project; Technical Specification Group Radio Access Network; Study on Minimization of drive-tests in Next Generation Networks; (Release 9), 23 pp.

Office Action dated Dec. 2, 2016 from corresponding U.S. Appl No. 15/290,663, 17 pp.

* cited by examiner

COMMUNICATION CONTROL METHOD, USER TERMINAL, PROCESSOR, STORAGE MEDIUM, AND BASE STATION

TECHNICAL FIELD

The present invention relates to a communication control method applied to a mobile communication system, a user terminal, a processor, a storage medium, and a base station.

BACKGROUND ART

In a mobile communication system, if a building is built in the vicinity of a base station, or if the installation status of a base station in the vicinity of the base station changes, the radio environment related to the base station changes. Therefore, conventionally, drive tests to measure and collect the radio environment are carried out by an operator with using a measurement vehicle on which a measuring instrument is installed.

Such measurement and collection may contribute to network optimization (for example, coverage optimization due to adjustment of parameters of the base station). However, there are problems in that the number of processes and cost increase.

Thus, in 3GPP (3rd Generation Partnership Project), which is a project aiming to standardize a mobile communication system, MDT (Minimization of Drive Tests) for automation of the measurement and collection using user terminals has been specified on and after Release 10 (see Non-patent Document 1, for example).

An example of the MDT is Logged MDT. In the Logged MDT, the user terminal in an idle state stores MDT measurement logs related to radio environments measured based on an instruction from a network and then transmits (reports) the stored MDT measurement logs to the network later.

PRIOR ART DOCUMENT

Non-Patent Document

Non-patent Document 1: 3GPP technology specifications TS 37.320 V10.4.0 December, 2011

SUMMARY OF THE INVENTION

However, the user terminal may fail to access to the network. The access (RRC connection establishment procedure) includes a random access process onto the network and a connection establishment process for performing establishment (including re-establishment) of connection with the network after the random access process.

Information about the access failure is useful for the network optimization described above. Disadvantageously, in the current specification, since there is no method for appropriately treating the information about the access failure, there is a problem in that the network is not sufficiently optimized.

Accordingly, an object of the present invention is to provide a communication control method, a user terminal, a processor, a storage medium, and a base station with which it is possible to appropriately treat information related to access failure to a network.

To solve the above problems, the present invention includes the following characteristics.

A communication control method according to a first feature is applied to a mobile communication system including a user terminal capable of storing an MDT measurement log related to a radio environment measured based on an instruction from a network and a connection establishment failure log related to a failure of RRC connection establishment procedure with the network. The method includes the steps of: reserving a dedicated memory area for storing the connection establishment failure log, by the user terminal; and storing the connection establishment failure log in the dedicated memory area reserved in the reserving step, by the user terminal.

A communication control method according to a second feature is applied to a mobile communication system including a user terminal capable of storing a connection establishment failure log related to a failure of RRC connection establishment procedure with a network. The method includes the steps of: when starting the RRC connection establishment procedure, starting a timer defining an upper limit time to continue the RRC connection establishment procedure, by the user terminal; and storing the connection establishment failure login association with an expiry of the timer, by the user terminal.

A communication control method according to a third feature is applied to a mobile communication system including a user terminal capable of storing an MDT measurement log related to a radio environment measured based on an instruction from a network and a connection establishment failure log related to a failure of RRC connection establishment procedure with the network. The method includes: a step of transmitting notification information indicating that a log is stored, from the user terminal to the network, by a predetermined trigger, when at least one of the MDT measurement log and the connection establishment failure log is stored. The notification information is configured to be capable of identifying a type of the log stored by the user terminal.

A communication control method according to a fourth feature is applied to a mobile communication system including a user terminal capable of storing a connection establishment failure log related to a failure of RRC connection establishment procedure with a network. The method includes: a step of transmitting, from the user terminal to the network, the connection establishment failure log and elapsed time information indicating an elapsed time from an occurrence time point of the failure of RRC connection establishment procedure.

DESCRIPTION OF EMBODIMENTS

Figure 1:
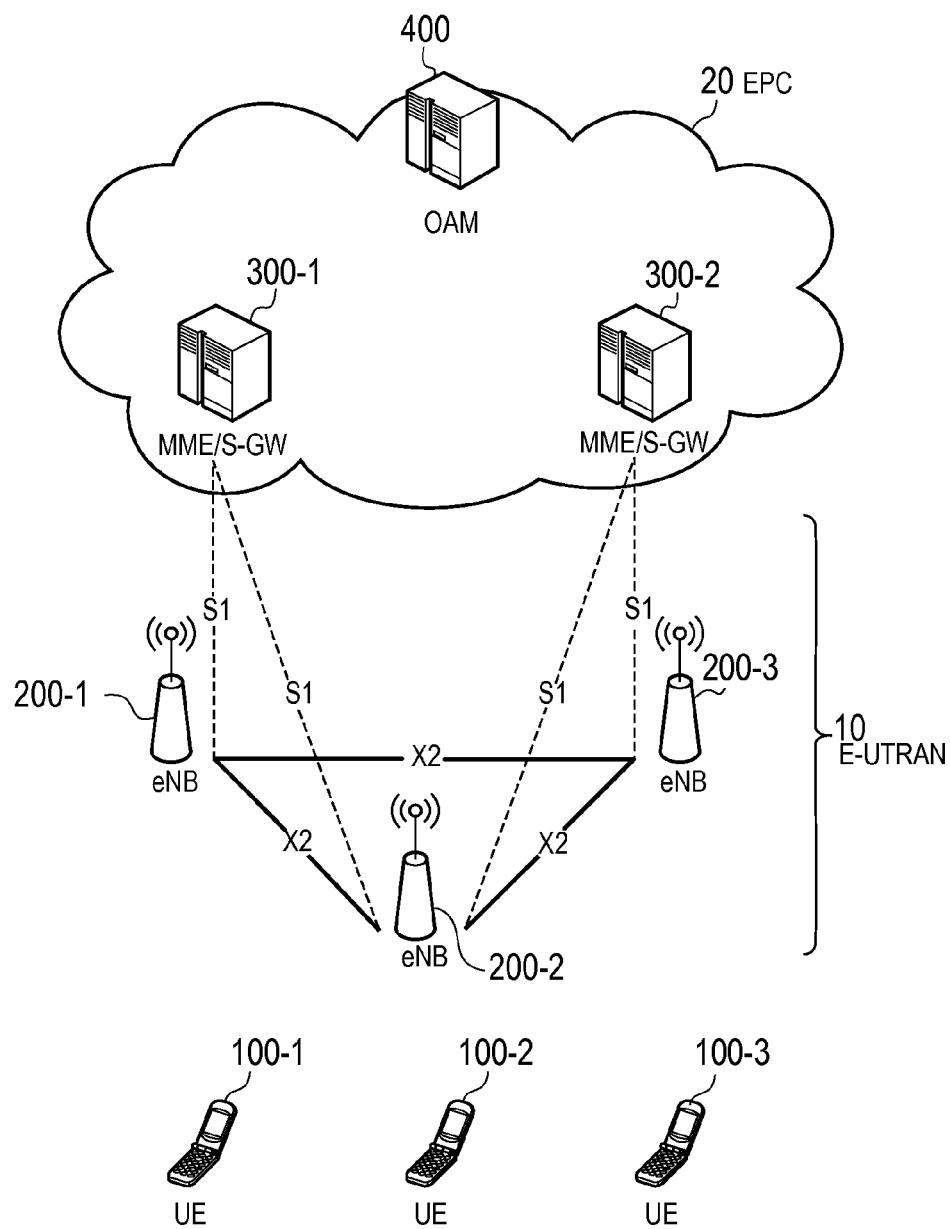
FIG. 1 is a configuration diagram of a mobile communication system according to an embodiment.

A communication control method according to embodiments is applied to a mobile communication system including a user terminal capable of storing an MDT measurement log related to a radio environment measured based on an instruction from a network and a connection establishment failure log related to a failure of RRC connection establishment procedure with the network. The method includes the steps of: reserving a dedicated memory area for storing the connection establishment failure log, by the user terminal; and storing the connection establishment failure log in the dedicated memory area reserved in the reserving step, by the user terminal.

According to the embodiments, in the reserving step, the user terminal reserves the dedicated memory area separately from a predetermined memory area for storing the MDT measurement log.

A user terminal according to embodiments is capable of storing an MDT measurement log related to a radio environment measured based on an instruction from a network and a connection establishment failure log related to a failure of RRC connection establishment procedure with the network. The user terminal reserves a dedicated memory area for storing the connection establishment failure log and then stores the connection establishment failure log in the dedicated memory area.

A processor according to embodiments executes a process for storing, in a memory, an MDT measurement log related to a radio environment measured based on an instruction from a network and a connection establishment failure log related to a failure of RRC connection establishment procedure with the network, the processor provided in a user terminal. The processor reserves a dedicated memory area for storing the connection establishment failure log and then stores the connection establishment failure log in the dedicated memory area.

A storage medium according to embodiments stores a program that causes a user terminal capable of storing an MDT measurement log related to a radio environment measured based on an instruction from a network and a connection establishment failure log related to a failure of RRC connection establishment procedure with the network, to execute: a step of reserving a dedicated memory area for storing the connection establishment failure log; and a step of storing the connection establishment failure log in the dedicated memory area reserved in the reserving step.

A communication control method according to embodiments is applied to a mobile communication system including a user terminal capable of storing a connection establishment failure log related to a failure of RRC connection establishment procedure with a network. The method includes the steps of: when starting the RRC connection establishment procedure, starting a timer defining an upper limit time to continue the RRC connection establishment procedure, by the user terminal; and storing the connection establishment failure login association with an expiry of the timer, by the user terminal.

According to the embodiments, the RRC connection establishment procedure includes a random access process onto the network. In the storing step, the user terminal stores a number of transmissions of random access preambles in the random access process, in the connection establishment failure log.

According to the embodiments, in the storing step, when the user terminal detects a contention of random access preambles, the user terminal stores information indicating a detection of the contention, in the connection establishment failure log.

A user terminal according to embodiments is capable of storing a connection establishment failure log related to a failure of RRC connection establishment procedure with a network. The user terminal includes: a controller that starts a timer defining an upper limit time to continue the RRC connection establishment procedure when starting the RRC connection establishment procedure. The controller stores the connection establishment failure log in association with an expiry of the timer.

A processor according to embodiments executes a process to store a connection establishment failure log related to a failure of RRC connection establishment procedure with a network, the processor provided in a user terminal. The processor executes: a process of starting a timer defining an upper limit time to continue the RRC connection establishment procedure when starting the RRC connection establishment procedure; and a process of storing the connection establishment failure login association with an expiry of the timer.

A storage medium according to embodiments stores a program that causes a user terminal capable of storing a connection establishment failure log related to a failure of RRC connection establishment procedure with a network, to execute: a process of starting a timer defining an upper limit time to continue the RRC connection establishment procedure when starting the RRC connection establishment procedure; and a process of storing the connection establishment failure log in association with an expiry of the timer.

A communication control method according to embodiments is applied to a mobile communication system including a user terminal capable of storing an MDT measurement log related to a radio environment measured based on an instruction from a network and a connection establishment failure log related to a failure of RRC connection establishment procedure with the network. The method includes: a step of transmitting notification information indicating that a log is stored, from the user terminal to the network, by a predetermined trigger, when at least one of the MDT measurement log and the connection establishment failure log is stored. The notification information is configured to be capable of identifying a type of the log stored by the user terminal.

According to the embodiments, when the user terminal stores the connection establishment failure log, the notification information indicates that the user terminal stores the connection establishment failure log.

According to the embodiments, the method further includes: a step of transmitting, from the network to the user terminal, request information for requesting a transmission of the log, based on the notification information after receiving the notification information from the user terminal. The request information is configured to be capable of identifying a type of the log for which the transmission is requested by the network.

According to the embodiments, the predetermined trigger is an event that the user terminal establishes or re-establishes a connection with the network.

A user terminal according to embodiments is capable of storing an MDT measurement log related to a radio environment measured based on an instruction from a network and a connection establishment failure log related to a failure of RRC connection establishment procedure with the network. The user terminal transmits notification information indicating that a log is stored, to the network, by a predetermined trigger, when at least one of the MDT measurement log and the connection establishment failure log is stored. The notification information is configured to be capable of identifying a type of the log stored by the user terminal.

A processor according to embodiments is provided in a user terminal. The processor executes: a process of storing, in a memory, an MDT measurement log related to a radio environment measured based on an instruction from a network and a connection establishment failure log related to a failure of RRC connection establishment procedure with the network; and a process of transmitting notification information indicating that a log is stored, to the network, by a predetermined trigger, when at least one of the MDT measurement log and the connection establishment failure log is stored. The notification information is configured to be capable of identifying a type of the log stored by the memory.

A storage medium according to embodiments stores a program that causes a user terminal capable of storing an MDT measurement log related to a radio environment measured based on an instruction from a network and a connection establishment failure log related to a failure of RRC connection establishment procedure with the network, to execute: a step of transmitting notification information indicating that a log is stored, to the network, by a predetermined trigger, when at least one of the MDT measurement log and the connection establishment failure log is stored. The notification information is configured to be capable of identifying a type of the log stored by the user terminal.

A base station according to embodiments establishes a connection with a user terminal capable of storing an MDT measurement log related to a radio environment measured based on an instruction from a network and a connection establishment failure log related to a failure of RRC connection establishment procedure with the network. The base station transmits, to the user terminal, request information for requesting a transmission of a log, based on notification information after receiving the notification information from the user terminal. The request information is configured to be capable of identifying a type of the log for which the transmission is requested by the base station.

A communication control method according to embodiments is applied to a mobile communication system including a user terminal capable of storing a connection establishment failure log related to a failure of RRC connection establishment procedure with a network. The method includes: a step of transmitting, from the user terminal to the network, the connection establishment failure log and elapsed time information indicating an elapsed time from an occurrence time point of the failure of RRC connection establishment procedure.

According to the embodiments, the method further includes: a step of starting a timer when the failure of RRC connection establishment procedure occurs, by the user terminal. In the transmitting step, the user terminal transmits information indicating a value of the timer at a time point of transmitting the connection establishment failure log, as the elapsed time information.

According to the embodiments, the method further includes: a step of retaining the connection establishment failure log without deleting until the value of the timer exceeds a threshold value after starting the timer, by the user terminal.

A user terminal according to embodiments is capable of storing a connection establishment failure log related to a failure of RRC connection establishment procedure with a network. The user terminal transmits, to the network, the connection establishment failure log and elapsed time information indicating an elapsed time from an occurrence time point of the failure of RRC connection establishment procedure.

A processor according to embodiments executes a process of storing, in a memory, a connection establishment failure log related to a failure of RRC connection establishment procedure with a network. The processor further executes a process of transmitting, to the network, the connection establishment failure log and elapsed time information indicating an elapsed time from an occurrence time point of the failure of RRC connection establishment procedure.

A storage medium according to embodiments stores a program that causes a user terminal capable of storing a connection establishment failure log related to a failure of RRC connection establishment procedure with a network, to execute a process of transmitting, to the network, the connection establishment failure log and elapsed time information indicating an elapsed time from an occurrence time point of the failure of RRC connection establishment procedure.

Hereinafter, embodiments of the present invention will be described with reference to the accompanying drawings. Note that in the following drawing according to the embodiments, identical or similar symbols are assigned to identical or similar portions.

(1) Overview of Mobile Communication System

FIG. 1 is a configuration diagram of a mobile communication system according to the present embodiment.

As illustrated in FIG. 1, a mobile communication system according to the present embodiment includes a plurality of UEs (User Equipments) 100, E-UTRAN (Evolved-UMTS Terrestrial Radio Access Network) 10, and EPC (Evolved Packet Core) 20. In the present embodiment, the E-UTRAN 10 and the EPC 20 constitute a network.

The UE 100 is a mobile radio communication device, and performs radio communication with a cell (hereinafter, referred to as a serving cell) connected thereto. In the present embodiment, the UE 100 corresponds to a user terminal.

In an idle state corresponding to a waiting state, the UE 100 selects awaiting cell and waits for an instruction from eNB 200 in the selected cell. A process of changing the waiting cell in the idle state is referred to as cell reselection. In addition, the UE 100 performs radio communication with the serving cell in a connected state corresponding to a communicating state. A process of changing the serving cell in the connected state is referred to as a handover.

The E-UTRAN 10 includes a plurality of eNBs (evolved Nodes-B) 200. The eNB 200 corresponds to a base station. The eNB 200 controls a cell and performs radio communication with the UE 100 connected to the cell. The "cell" is a term used for indicating a minimum unit of a radio communication area and has also a function for performing radio communication with the UE 100.

For example, the eNB 200 includes a radio resource management (RRM) function, a routing function of user data, and a measurement control function for mobility control and scheduling.

The EPC 20 includes MMEs (Mobility management Entities)/S-GWs (Serving-Gateways) 300, and OAM (Operation and Maintenance) 400.

The MME is a network node for performing various mobility controls for the UE 100 and corresponds to a control station. The S-GW is a network node for performing a transfer control of user data, and corresponds to a mobile switching center.

The eNBs 200 are connected to one another through an X2 interface. In addition, the eNB 200 is connected to the MME/S-GW 300 through an S1 interface.

The OAM 400 is a server device managed by an operator, and performs the maintenance and monitoring of the E-UTRAN 10. The OAM 400 can also control the UE 100.

Figure 2:
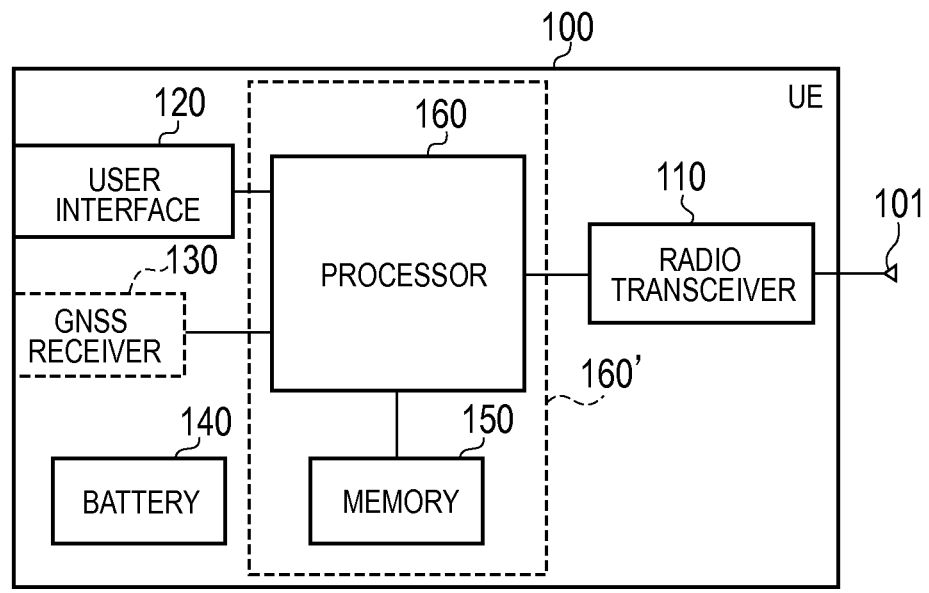
FIG. 2 is a block diagram of UE according to the embodiment.

Next, configurations of the UE 100 and the eNB 200 will be described. FIG. 2 is a block diagram of the UE 100.

As illustrated in FIG. 2, the UE 100 includes an antenna 101, a radio transceiver 110, a user interface 120, a GNSS (Global Navigation Satellite System) receiver 130, a battery 140, a memory 150, and a processor 160. Although the configuration of the UE 100 having the GNSS receiver 130 has been described, the UE 100 not having the GNSS receiver 130 is also present. In addition, the memory 150 is integrated with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into a radio signal to transmit the converted radio signal through the antenna 101, and converts a radio signal received by the antenna 101 into a baseband signal to output the converted baseband signal to the processor 160.

The user interface 120 is an interface between the UE 100 and a user of the UE 100, and includes, for example, a display, a microphone, a speaker, and various buttons. The user interface 120 receives a manipulation from the user, and outputs a signal indicating a content of the manipulation to the processor 160.

In order to acquire location information indicating a geographical location of the UE 100, the GNSS receiver 130 receives a GNSS signal, and outputs the received signal to the processor 160.

The battery 140 stores a power to be supplied to each block of the UE 100.

The memory 150 stores a program executed by the processor 160 and information used for a process by the processor 160. Details of the information stored in the memory 150 will be described below.

The processor 160 includes a baseband processor that performs modulation and demodulation, encoding and decoding of the baseband signal, etc., and a CPU (Central Processing Unit) that executes the program stored in the memory 150 to perform various processes. The CPU has a function of a timer for counting time. The processor 160 may further include a codec that performs encoding and decoding of a sound/video signal. Details of a process performed by the processor 160 will be described below.

The processor 160 acquires location information on the basis of an output signal of the GNSS receiver 130. When the UE 100 does not have the GNSS receiver 130, the processor 160 may execute a positioning method (OTDOA method or the like) on the basis of the radio signal received by the radio transceiver 110 from the plurality of eNBs 200 (a plurality of cells).

Figure 3:
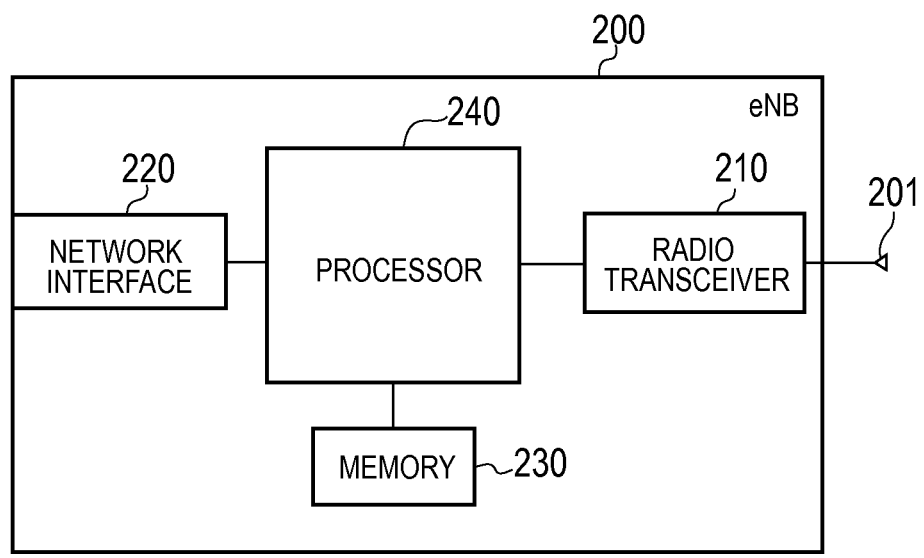
FIG. 3 is a block diagram of eNB according to the embodiment.

FIG. 3 is a block diagram of the eNB 200. As illustrated in FIG. 3, the eNB 200 includes an antenna 201, a radio transceiver 210, a network interface 220, a memory 230, and a processor 240.

The antenna 201 and the radio transceiver 210 are used to transmit and receive a radio signal. The antenna 201 includes a plurality of antenna elements. The radio transceiver 210 converts a baseband signal output from the processor 240 into a radio signal to transmit the converted radio signal through the antenna 201, and converts a radio signal received by the antenna 201 into a baseband signal to output to the processor 240.

The network interface 220 is used for communication performed over the X2 interface and the S1 interface.

The memory 230 stores a program executed by the processor 240 and information used for a process by the processor 240.

The processor 240 includes a baseband processor that performs modulation and demodulation, and encoding and decoding of the baseband signal and a CPU that executes the program stored in the memory 230 to perform various processes. Details of a process performed by the processor 240 will be described below.

Figure 4:
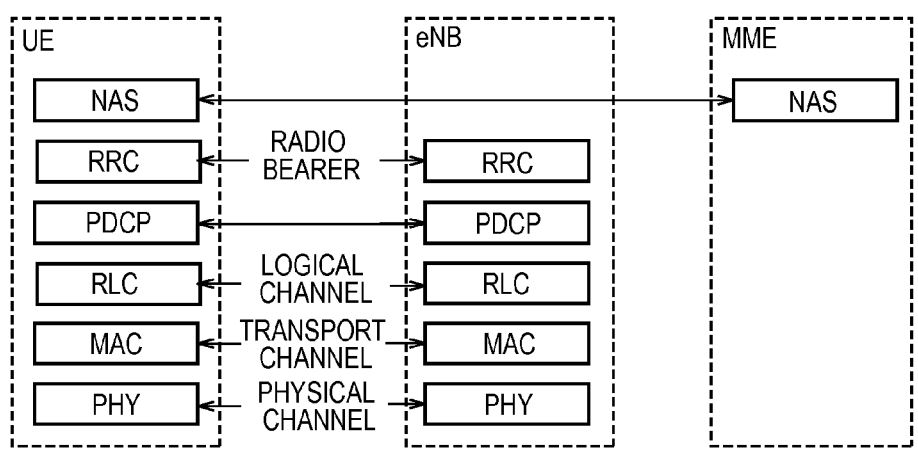
FIG. 4 is a protocol stack diagram of a radio interface according to the embodiment.

FIG. 4 is a protocol stack diagram of a radio interface.

As illustrated in FIG. 4, the radio interface protocol is divided into layers 1 to 3 of an OSI reference model, and the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a transport format of an uplink and a downlink (for example, a transport block size, and a modulation and coding scheme) and a MAC scheduler for determining a resource block.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and extension, and encryption and decryption.

The RRC layer is defined only in a control plane. Between the RRC layer of the UE 100 and the RRC layer of the eNB 200, data is transmitted through a radio bearer. The RRC layer controls the logical channel, the transport channel, and the physical channel in response to establishment, re-establishment, and release of the radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management.

Figure 5:
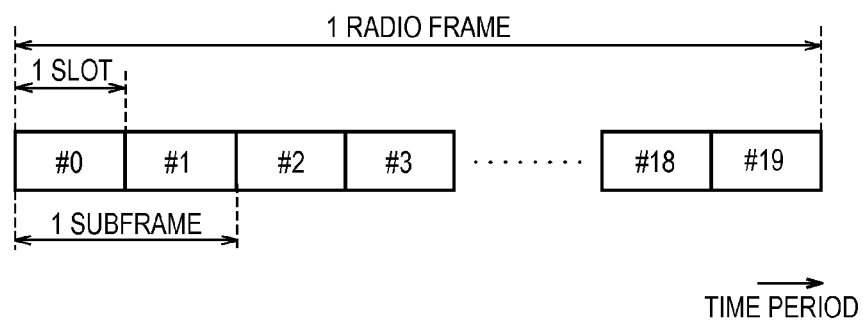
FIG. 5 is a configuration diagram of a radio frame used in the mobile communication system according to the embodiment.

FIG. 5 is a configuration diagram of a radio frame used in the mobile communication system. The mobile communication system employs each of OFDMA (Orthogonal Frequency Division Multiplexing Access) in a downlink and SC-FDMA (Single Carrier Frequency Division Multiple Access) in an uplink.

As illustrated in FIG. 5, the radio frame includes 10 subframes arranged in a time-period direction, wherein each subframe includes two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP).

In the downlink, an interval of several symbols at the head of each subframe is a control region mainly used as a physical downlink control channel (PDCCH). Furthermore, the other interval of each subframe is a data region mainly used as a physical downlink shared channel (PDSCH).

In the uplink, both ends in the frequency direction of each subframe are control regions mainly used as a physical uplink control channel (PUCCH). Furthermore, the center part in the frequency direction of each subframe is a data region mainly used as a physical uplink shared channel (PUSCH).

(2) Overview of Mdt

The mobile communication system according to the present embodiment supports Logged MDT which is one kind of MDT. Although details of the Logged MDT are described in Non Patent Literature 1, an overview of the Logged MDT defined in the current specification will be described.

In the Logged MDT, the UE 100 in the idle state performs measurement of a radio environment (for example, a reference signal received power (RSRP)) and a reference signal received quality (RSRQ) according to configuration (Logged Measurement Configuration) instructed from a network, and stores the measurement result together with location information and time information as an MDT measurement log.

The configuration of the MDT includes various parameters such as a measurement trigger, a measurement period, and a network time. The measurement trigger is a parameter for designating an event performing measurement. The measurement period is a parameter for designating a period until an MDT measurement process is finished from the configuration of the MDT is set. The network time is a parameter serving as a criterion of the time information.

Upon receiving the configuration of the MDT (the Logged Measurement Configuration) from the network in the connected state, the UE 100 sets the measurement period included in the configuration to a Duration timer within the UE 100 and starts the Duration timer. In the idle state, when the event designated by the measurement trigger is detected, the UE 100 performs measurement of the radio environment, and stores the MDT measurement log which includes the measurement result, the location information, and the time information. The location information included in the MDT measurement log is information lately acquired within a valid time. Furthermore, the time information is generated on the basis of the network time of the measurement parameters. Specifically, the time information includes the network time (a criterion time) included in the configuration of the MDT and an elapsed time (a relative time) until the measurement is performed from the network time. Accordingly, the network can estimate a network time at the time of the measurement from the network time (the criterion time) and the elapsed time (the relative time).

When the MDT measurement log is stored, the UE 100 monitors whether or not a transmission event of Availability Indicator (notification information) occurs. The transmission event of the Availability Indicator means that the UE 100 establishes or re-establishes connection with the network. Specifically, the transmission event of the Availability Indicator denotes transmission from the idle state to the connected state (RRC connection establishment), execution of a handover (RRC connection re-establishment), and a new configuration at an RRC layer (RRC re-configuration).

Upon receiving a transmission request of the MDT measurement log from the network in response to the Availability Indicator, the UE 100 transmits (reports) the stored MDT measurement log to the network. If the eNB 200 or the OAM 400 finds a coverage problem on the basis of the MDT measurement log acquired in this way, the eNB 200 or the OAM 400 can perform network optimization for notifying an operator of the found coverage problem or solving the found coverage problem.

When the Duration described above expires, the UE 100 starts a 48-hour timer that counts time (48 hours in the specification) for retaining the log. The UE 100 needs to retain the MDT measurement log without deleting until the 48-hour timer expires. Here, when the 48-hour timer expires without receiving the transmission request of the MDT measurement log from the network, the UE 100 may delete the MDT measurement log.

(3) Overview of Access Procedure to Network

Figure 6:
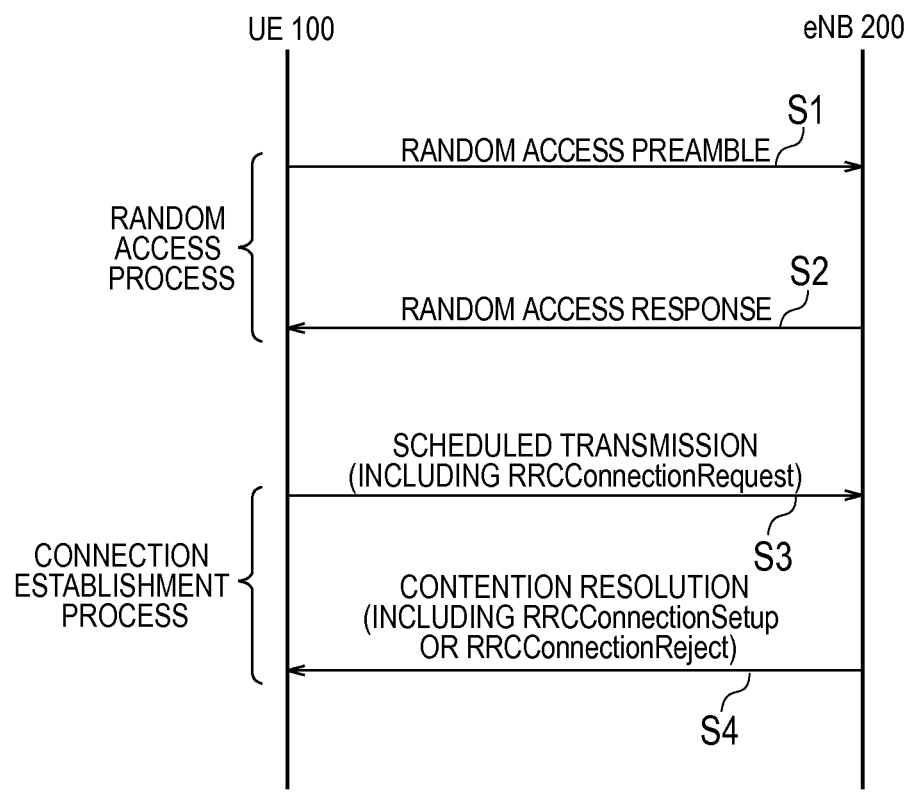
FIG. 6 is a sequence diagram of an access procedure according to the embodiment.

FIG. 6 is a sequence diagram of an access procedure (RRC connection establishment procedure) when the UE 100 performs the access to the network (the eNB 200). Although details of the access procedure (a random access procedure) are described in, for example, TS36.321, an overview thereof will be described below.

The access procedure illustrated in FIG. 6 is started when the UE 100 performs an initial connection or a re-connection to the network (the eNB 200). Prior to step S1, the UE 100 establishes the synchronization with the eNB 200 in the downlink by a cell search, receives and decodes the broadcast information (MIB and SIB) from the eNB 200, and starts the random access process to establish the synchronization in the uplink.

The RRC connection establishment procedure is started by requesting an RRC connection establishment from an RRC layer to a MAC layer in UE 100. The UE 100 starts a timer called as T300 when starting the RRC connection establishment procedure. The T300 is a timer defining an upper limit time to continue the RRC connection establishment procedure.

As illustrated in FIG. 6, in step S1, the UE 100 transmits a random access preamble to the eNB 200 over a random access channel (RACH). The RACH is mapped onto a physical random access channel (PRACH). Specifically, the eNB 200 transmits information about resources (random access resources) available for transmission of the random access preamble by a broadcast (for example, transmits by SIB2), and the UE 100 transmits the random access preamble by using a random access resource selected from among the available random access resources. The random access resource includes a preamble sequence.

In step S2, after receiving the random access preamble from the UE 100, the eNB 200 performs delay estimation between the UE 100 and the eNB 200 on the basis of the random access preamble and determines a resource to be used in step S3. The eNB 200 transmits a random access response as a response for the random access preamble to the UE 100 over the DL-SCH. The random access response includes a timing correction value based on a result of the delay estimation and the determined assigned resource information.

Here, the UE 100 may not always normally receive the random access response from the eNB 200. When the random access response from the eNB 200 is not received within a predetermined time (a time window width) after the transmission of the random access preamble, that is, when the random access process onto the eNB 200 fails, the UE 100 reselects the random access resource and starts the random access process (step S1) again. When the random access is started again, a transmission power of the random access preamble is increased by a predetermined step size. The transmission of the random access preamble may be performed multiple times, and even when the transmission of the random access preamble is performed multiple times, the random access process may not be successful.

Further, in step S1, when the plurality of UEs 100 transmit the random access preamble by the same random access resource (the preamble sequence), access contention occurs. In such a case, in step S2, since the plurality of UEs 100 respond to the random access response transmitted from the eNB 200, a collision occurs. Such access contention is solved by the RRC connection establishment process.

In step S3, after receiving the random access response from the eNB 200, the UE 100 transmits a connection establishment request (RRC Connection Request) to the eNB 200 over the CCCH by using the resource indicated by the random access response. The connection establishment request includes identification information (a temporary identifier) of the UE 100. Furthermore, the UE 100 transmits the connection establishment request and starts a timer called TS300.

In step S4, after receiving the connection establishment request from the UE 100, the eNB 200 transmits a connection establishment response as a response for the connection establishment request to the UE 100 over the CCCH. The connection establishment response is a positive response (RRC Connection Setup) or a negative response (RRC Connection Reject). The connection establishment response includes the identification information of the UE 100 as a transmission destination.

Upon normally receiving the connection establishment response (acknowledge or unacknowledged) from the eNB 200, the UE 100 stops the T300 timer. In addition, the UE 100 checks whether or not the UE identification information included in the connection establishment response matches the UE identification information transmitted from the UE 100 in step S3. When the UE identification information matches each other, the UE 100 determines that the connection establishment response is addressed to the UE 100 and the connection establishment with the eNB 200 is completed.

In contrast, when the UE identification information does not match each other, the UE 100 determines that the connection establishment response is not addressed to the UE 100. In such a case, the UE 100 determines that the RRC connection establishment process fails, reselects the random access resource, and starts the random access process (step S1) again.

When the connection establishment response from the eNB 200 is not received, that is, when the connection establishment response is not received before the T300 timer expires, the UE 100 determines that the RRC connection establishment process fails, reselects the random access resource, and starts the random access process (step S1) again.

Below, the failure of RRC connection establishment procedure mainly refers to the expiry of T300 timer without stopping it.

(4) Operation According to Embodiment

Hereinafter, the operation of the mobile communication system according to the present embodiment will be described while focusing on the operation of the UE 100.

When the access procedure illustrated in FIG. 6 fails, if the network recognizes information about the access failure, by optimizing the parameter of, for example, the eNB 200, it is possible to reduce the occurrence frequency of the subsequent access failure. However, in the current specification, as a result of the access failure, when the UE 100 maintains the idle state, there is a problem in that the information about the access failure is not reported to the network.

Accordingly, when the RRC connection establishment procedure (access procedure) fails, the UE 100 according to the present embodiment stores a connection establishment failure log (access failure log) related to the access failure. Even though the configuration (Configuration) from the network is not performed, if the access to the network fails, the UE 100 stores autonomously the connection establishment failure log. This operation is different from the MDT that does not store the log if the configuration from the network is not performed.

Hereinafter, the storing and reporting of the connection establishment failure log will be described.

(4.1) Management of Memory Area

When the UE 100 stores both the MDT measurement log and the connection establishment failure log, it is necessary to manage the memory area of the memory 150 of the UE 100 so that each log can be appropriately stored. In the present embodiment, the processor 160 of the UE 100 reserves a dedicated memory area for storing the connection establishment failure log. Further, the processor 160 stores the connection establishment failure log in the reserved dedicated memory area.

Figure 7:
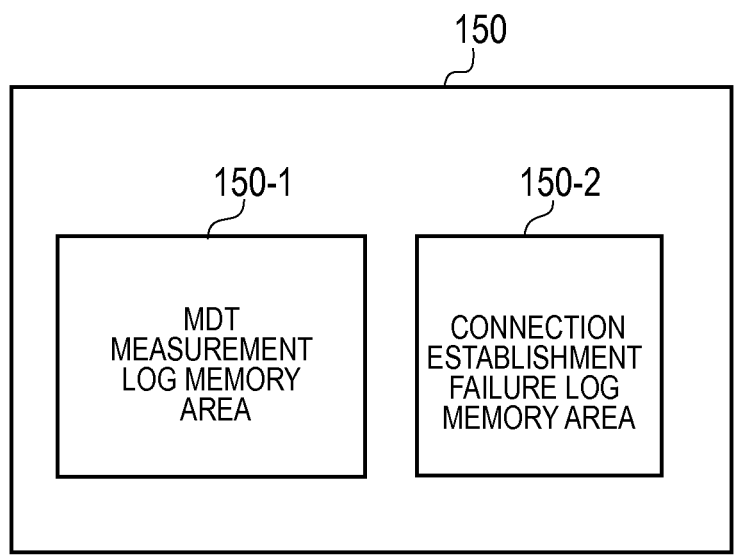
FIG. 7 is a diagram for describing a method 1 of managing a memory area according to the embodiment.

FIG. 7 is a diagram for describing a method 1 of managing a memory area according to the present embodiment.

As illustrated in FIG. 7, the processor 160 reserves previously a dedicated memory area 150-2 for storing the connection establishment failure log in the memory 150 in addition to a memory area (a predetermined memory area) 150-1 for storing the MDT measurement log. In the specification, a capacity of the memory area 150-1 for storing the MDT measurement log is defined as at least 64 kilobytes. The processor 160 stores the connection establishment failure log in the reserved dedicated memory area.

Figure 8:
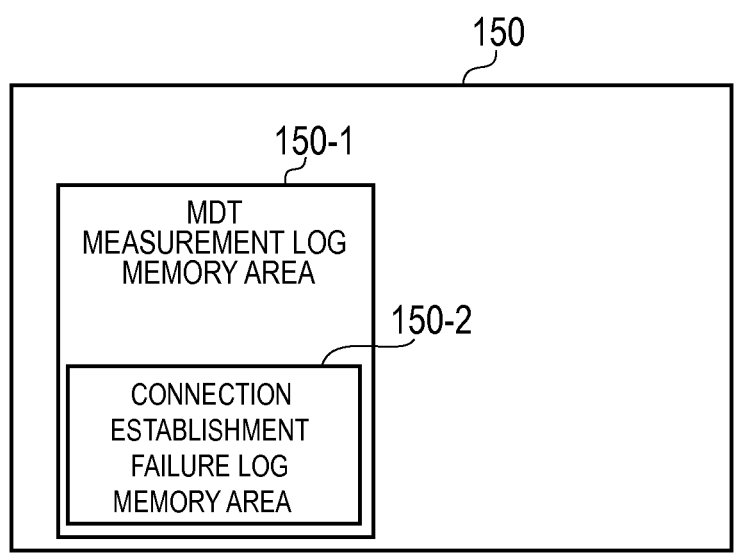
FIG. 8 is a diagram for describing a method 2 of managing a memory area according to the embodiment.

FIG. 8 is a diagram for describing a method 2 of managing a memory area according to the present embodiment.

As illustrated in FIG. 8, the processor 160 reserves the dedicated memory area 150-2 for storing the connection establishment failure log within the memory area 150-1 for storing the MDT measurement log. In such a case, it is necessary to control the memory area 150-1 so as not to be filled with the MDT measurement log. For this reason, when a data amount of the MDT measurement log exceeds a threshold value, by not storing the MDT measurement log subsequent to exceeding the threshold value, the processor 160 reserves the dedicated memory area 150-2. Accordingly, it is possible to previously reserve the dedicated memory area 150-2 within the memory area 150-1.

Alternatively, when necessary, the dedicated memory area 150-2 may temporarily be reserved within the memory area 150-1. Specifically, when an empty area capable of storing the connection establishment failure log does not exist within the memory area 150-1, the processor 160 reserves the dedicated memory area 150-2 within the memory area 150-1, by deleting a part of the MDT measurement log stored within the memory area 150-1.

In this way, the UE 100 capable of storing the MDT measurement log related to the radio environment measured on the basis of the instruction from the network and the connection establishment failure log related to the access failure to the network, reserves the dedicated memory area 150-2 for storing the connection establishment failure log. The UE 100 stores the connection establishment failure log in the reserved dedicated memory area 150-2.

Accordingly, since the connection establishment failure log and the MDT measurement log can be separately stored, it is possible to individually transmit the MDT measurement log and the connection establishment failure log to the network. Thus, the network needs not to perform a complicate process of distinguishing the MDT measurement log and the connection establishment failure log to separate them.

In the method 1 of managing a memory area illustrated in FIG. 7, since the UE 100 reserves previously the dedicated memory area 150-2 for storing the connection establishment failure log separated from the memory area 150-1 for storing the MDT measurement log, a consumption amount of the memory area of the memory 150 increases, but the connection establishment failure log can be more securely stored separately from the MDT measurement log.

In the method 2 of managing a memory area illustrated in FIG. 8, since the dedicated memory area 150-2 for storing the connection establishment failure log is temporarily reserved within the memory area 150-1 for storing the MDT measurement log, the UE 100 can store the connection establishment failure log separately from the MDT measurement log while suppressing the consumption amount of the memory area of the memory 150.

(4.2) Content of Connection Establishment Failure Log

Next, the content of the connection establishment failure log according to the present embodiment will be described.

The connection establishment failure log according to the present embodiment includes a cell ID of a cell to which the UE 100 fails to perform RRC connection establishment (access), the number of transmissions of the random access preambles, the radio environment when the UE 100 fails to access (the radio environment related to the cell to which the UE 100 fails to access), and a reselection reason of the random access resource. The connection establishment failure log may further include time information and location information. Details of the time information in the connection establishment failure log will be described below. In addition, the connection establishment failure log may include movement speed information acquired on the basis of the location information.

The "reselection reason of the random access resource" included in the connection establishment failure log will be described here. As described above, the access to the network includes: a random access process onto the network; and a connection establishment process that establishes a connection with the network after the random access process. The UE 100 capable of storing the connection establishment failure log related to the access failure to the network reselects the random access resource used for the random access process whenever the access failure (failure of the random access process or failure of the connection establishment process) occurs.

The UE 100 stores the connection establishment failure log in association with the reselection of the random access resource. Specifically, when the random access resource is reselected at the time of the access failure, the UE 100 adds information indicating a reason of the reselection to the connection establishment failure log for the access failure. In addition, one connection establishment failure log corresponds to the same random access resource and a new connection establishment failure log can be generated whenever the random access resource is reselected.

The random access process includes a process of transmitting the random access preamble to the network from the UE 100 and a process of transmitting the random access response to the UE 100 from the network. The connection establishment process includes a process of transmitting the connection establishment request to the network from the UE 100 and a process of transmitting the connection establishment response to the UE 100 from the network.

The reselection reason of the random access resource is that for example, the UE 100 does not receive the random access response, the UE 100 does not receive the connection establishment response, or the identification information of the UE 100 is not included in the connection establishment response received by the UE 100.

"The UE 100 does not receive the random access response" means that the UE 100 does not receive the random access response within the time window width after transmitting the random access preamble. "The UE 100 does not receive the connection establishment response" means that the UE 100 does not receive the connection establishment response before the T300 timer expires after transmitting the connection establishment request. "The identification information of the UE 100 is not included in the connection establishment response received by the UE 100" means that the UE 100 is not selected as a result of the access contention.

The access failure due to the reason that the UE 100 does not receive the random access response and the access failure due to the reason that the UE 100 does not receive the connection establishment response can be improved by optimizing the parameter of the eNB 200. Meanwhile, the access failure due to the access contention is difficult to be improved even by optimizing the parameter of the eNB 200. Accordingly, the reselection reason of the random access resource included in the connection establishment failure log may include only the reason that "the UE 100 does not receive the random access response" and the reason that "the UE 100 does not receive the connection establishment response". Alternatively, the connection establishment failure log for the access failure due to the access contention may be deleted.

In this way, by storing the connection establishment failure log in association with the reselection of the random access resource, it is possible to effectively store the connection establishment failure log having high usefulness.

(4.3) Time Information

Next, the "time information" included in the connection establishment failure log will be described.

As described above, in the UE 100 to which the MDT is configured (Configuration), since the network time (criterion time) is included in the configuration, the elapsed time until the measurement is performed from the network time is counted by the timer and the time information at the time of measuring is obtained.

Meanwhile, since the connection establishment failure log needs to be stored even in the UE 100 to which the MDT is not configured (Configuration), the network time as a criterion may not be present in the UE 100. In such a case, it is difficult to obtain the time information at the time of the access failure.

Figure 9:
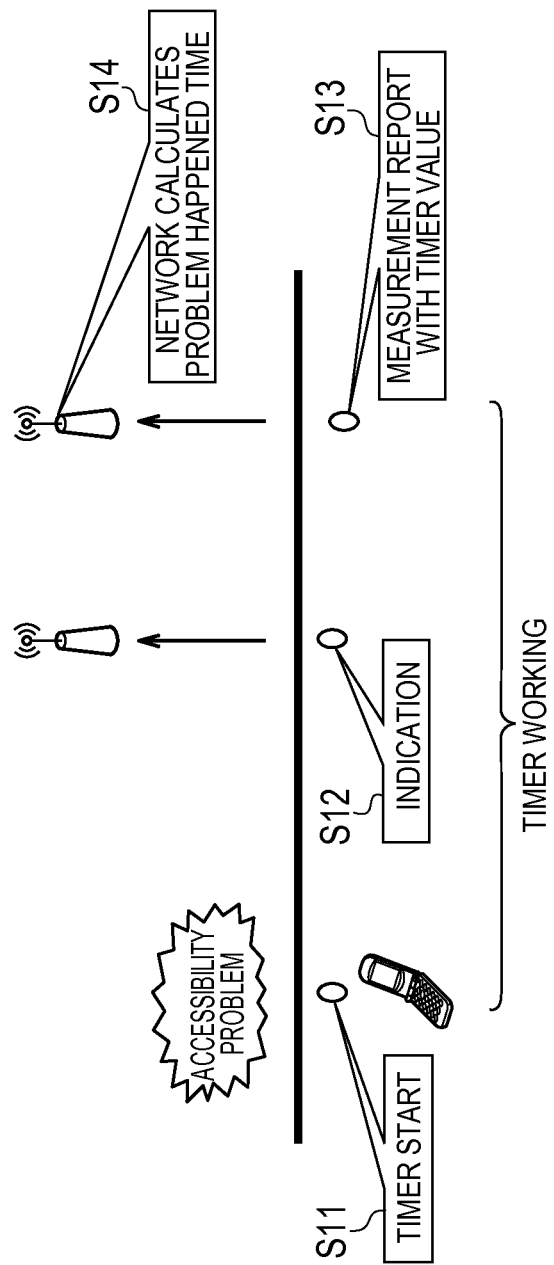
FIG. 9 is a diagram for describing time information according to the embodiment.

Accordingly, in the present embodiment, the time information at the time of the access failure is obtained as follows. FIG. 9 is a diagram for describing the time information according to the present embodiment.

As illustrated in FIG. 9, in step S11, when the access failure occurs, the UE 100 starts the timer (hereinafter, referred to as a "timer for elapsed time") for counting the elapsed time until the connection establishment failure log is transmitted. In the present embodiment, the UE 100 needs to retain the connection establishment failure log without deleting until a value of the timer for elapsed time reaches a threshold value.

In step S12, when the connection establishment failure log is stored and then the transmission event of the Availability Indicator occurs, the UE 100 transmits the Availability Indicator indicating that the connection establishment failure log is stored to the network (the eNB 200). The transmission event of the Availability Indicator of the connection establishment failure log may be the same as the transmission event of the Availability Indicator of the MDT measurement log. Further, the UE 100 may generate the elapsed time information indicating the elapsed time until the connection establishment failure log is transmitted from the occurrence of the access failure on the basis of the value of the timer for elapsed time started in step S11.

It is described in the assumption that the eNB 200 requests the transmission of the connection establishment failure log to the UE 100 on the basis of the Availability Indicator.

In step S13, the UE 100 transmits the stored connection establishment failure log to the eNB 200 in response to the request from the eNB 200. At this time, the UE 100 transmits the value (the elapsed time information) of the timer for elapsed time started in step S11 while being included in the connection establishment failure log.

In step S14, the eNB 200 receives the connection establishment failure log and the elapsed time information from the UE 100 and estimates the network time corresponding to the occurrence time point of the access failure on the basis of the elapsed time information and the network time managed by the network. Specifically, the eNB 200 estimates the network time corresponding to the occurrence time point of the access failure by subtracting the elapsed time that is indicated by the elapsed time information, from the network time at the time point of receiving the connection establishment failure log and the elapsed time information from the UE 100. Here, although it has been described that the estimation is performed by eNB 200, the estimation may be performed by the OAM 400.

In this way, even when the network time as a criterion is not present in the UE 100, the network can estimate the network time corresponding to the occurrence time point of the access failure.

FIG. 9 illustrates a case where the connection establishment failure log for the access failure at one time is transmitted to the network. However, when a plurality of connection establishment failure logs for access failure occurring multiple times are transmitted all together to the network, it is necessary to change as follows.

Specifically, after starting the timer for elapsed time, when new access failure occurs, the UE 100 stores a value of the timer for elapsed time at the occurrence time point of the new access failure.

For example, when an connection establishment failure log 1 for first access failure is stored and second access failure occurs, the UE 100 stores a value (elapsed time information 1) of the timer for elapsed time at the time point of the second access failure.

Thereafter, when the connection establishment failure log 1 for the first access failure and an connection establishment failure log 2 for the second access failure are together transmitted to the network, the UE 100 adds the elapsed time information 1 to the connection establishment failure log 2 and also adds a value (elapsed time information 2) of the timer at a current time point to the connection establishment failure log 1.

Upon receiving the connection establishment failure logs 1 and 2, by subtracting the elapsed time information 2 from the current network time, the network estimates the network time (network time 1) at the time point of the access failure corresponding to the connection establishment failure log 1.

In addition, by adding the elapsed time information 1 to the estimated network time 1, the network estimates the network time (network time 2) at the time of the access failure corresponding to the connection establishment failure log 2.

In this way, even when the multiple times of access failure until the log is transmitted occur, the network time at the time of the access failure can appropriately be estimated.

(4.4) Method of Reporting Log

Next, the transmission of the connection establishment failure log (that is, log reporting) to the network will be described.

In the present embodiment, when the UE 100, which is capable of storing the MDT measurement log and the connection establishment failure log, stores at least one of the MDT measurement log and the connection establishment failure log, the UE 100 transmits, by a predetermined trigger, the Availability Indicator (notification information) indicating that the log is stored to the network. The Availability Indicator is configured to be capable of identifying the type of the log stored by the UE 100. In other words, when the UE 100 stores the connection establishment failure log, the Availability Indicator can indicate that the UE 100 stores the connection establishment failure log.

Furthermore, after the notification information from the UE 100 is received, when the network (the eNB 200) transmits, to the UE 100, a Log Request (request information) for requesting the transmission of the log on the basis of the notification information, the Log Request may be configured to be capable of identifying the type of the log that requests the transmission.

Figure 10:
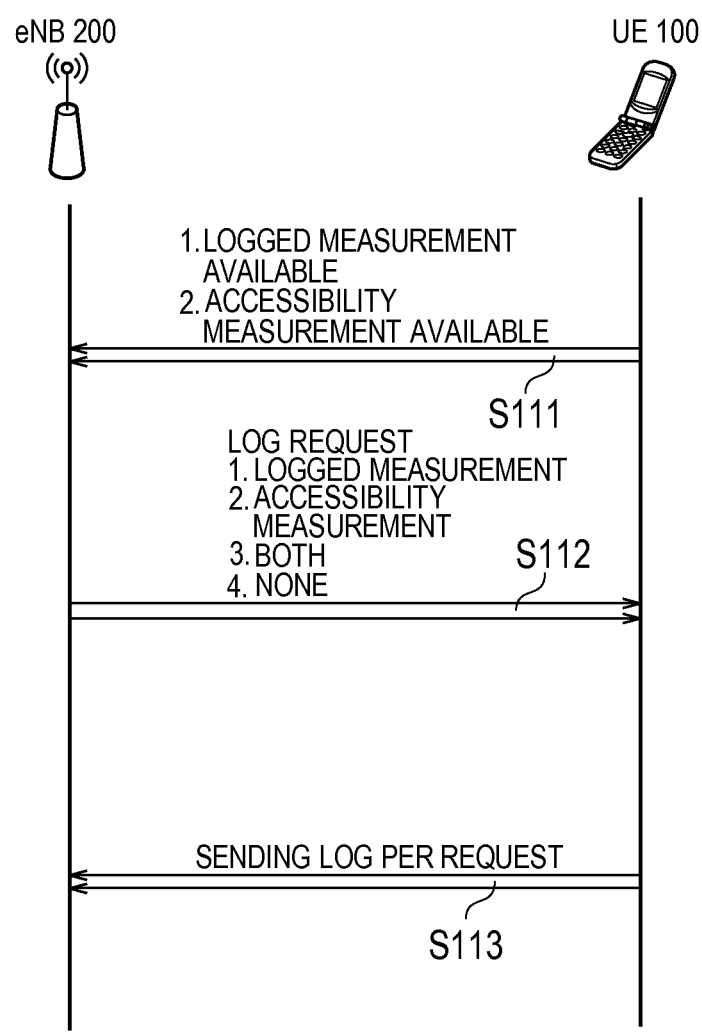
FIG. 10 is a sequence diagram of a method 1 of reporting a log according to the embodiment.

FIG. 10 is a sequence diagram of a method 1 of reporting a log according to the present embodiment. Hereinafter, it is assumed that the UE 100 stores at least one of the MDT measurement log and the connection establishment failure log.

As illustrated in FIG. 10, in step S111, when the transmission event of the Availability Indicator in the MDT occurs, the UE 100 transmits the Availability Indicator to the eNB 200. The Availability Indicator is configured to be capable of identifying the type of the log stored by the UE 100. For example, the Availability Indicator includes a one-bit flag indicating whether or not the MDT measurement log is present and a one-bit flag indicating whether or not the connection establishment failure log is present.

Otherwise, the Availability Indicator may be divided into the Availability Indicator indicating whether or not the MDT measurement log is present and the Availability Indicator indicating whether or not the connection establishment failure log is present.

In this way, in this sequence, a trigger (a predetermined trigger) transmitting the Availability Indicator indicating that the connection establishment failure log is stored is the same as the transmission event of the Availability Indicator in the MDT.

The eNB 200 distinguishes the type of the log (the MDT measurement log and the connection establishment failure log) stored by the UE 100 on the basis of the Availability Indicator received from the UE 100. The eNB 200 determines whether or not the transmission of the MDT measurement log is requested and whether or not the transmission of the connection establishment failure log is requested. A criterion of the determination may be manually set by the operator and may be automatically set by the network depending on the parameter to be optimized.

In step S112, the eNB 200 transmits the Log Request for requesting the transmission of the log to the UE 100. The Log Request is configured to be capable of identifying the type of the log that requests the transmission. For example, the Log Request includes a one-bit flag indicating whether or not the transmission of the MDT measurement log is requested and a one-bit flag indicating whether or not the transmission of the connection establishment failure log is requested. Alternatively, the Log Request may be divided into the Log Request indicating whether or not the transmission of the MDT measurement log is requested and the Log Request indicating whether or not the connection establishment failure log is present.

In step S113, the UE 100 transmits the log of which transmission is requested (the MDT measurement log or the connection establishment failure log) to the eNB 200 on the basis of the Log Request received from the eNB 200.

In this way, according to the method 1 of reporting a log, the network (the eNB 200) can acquire only a necessary log of the MDT measurement log and the connection establishment failure log.

Figure 11:
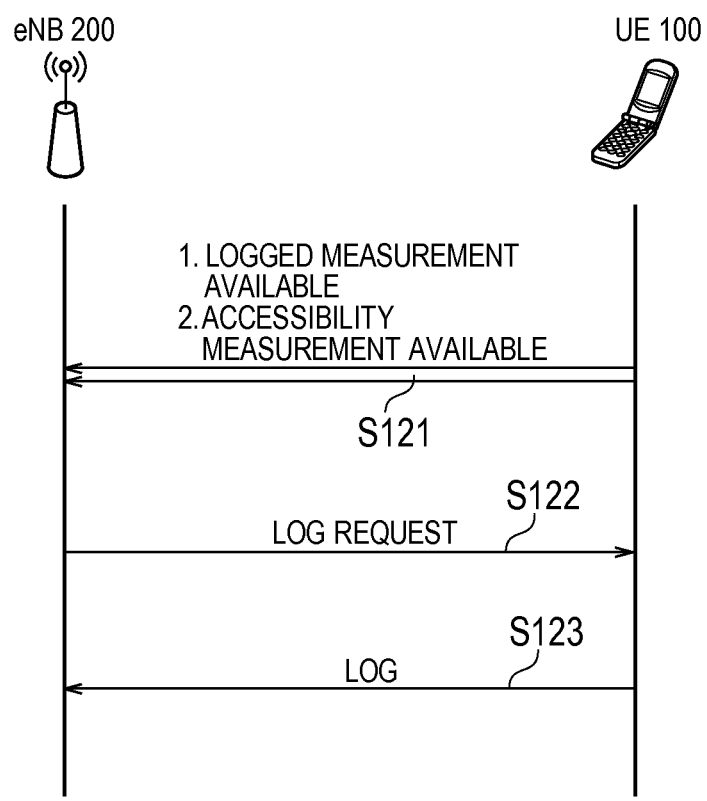
FIG. 11 is a sequence diagram of a method 2 of reporting a log according to the embodiment.

FIG. 11 is a sequence diagram of a method 2 of reporting a log according to the present embodiment. A difference from the method 1 of reporting a log will be described.

As illustrated in FIG. 11, step S121 is the same as that in the method 1 of reporting a log and step S122 is different from that in the method 1 of reporting a log. Specifically, in step S122, the eNB 200 requests the transmission of the log to the UE 100 without distinguishing the MDT measurement log and the connection establishment failure log. In such a case, in step S123, the UE 100 transmits all the stored logs to the eNB 200 without distinguishing the MDT measurement log and the connection establishment failure log.

In this way, according to the method 2 of reporting a log, it is possible to simplify the process as compared to the method 1 of reporting a log.

Figure 12:
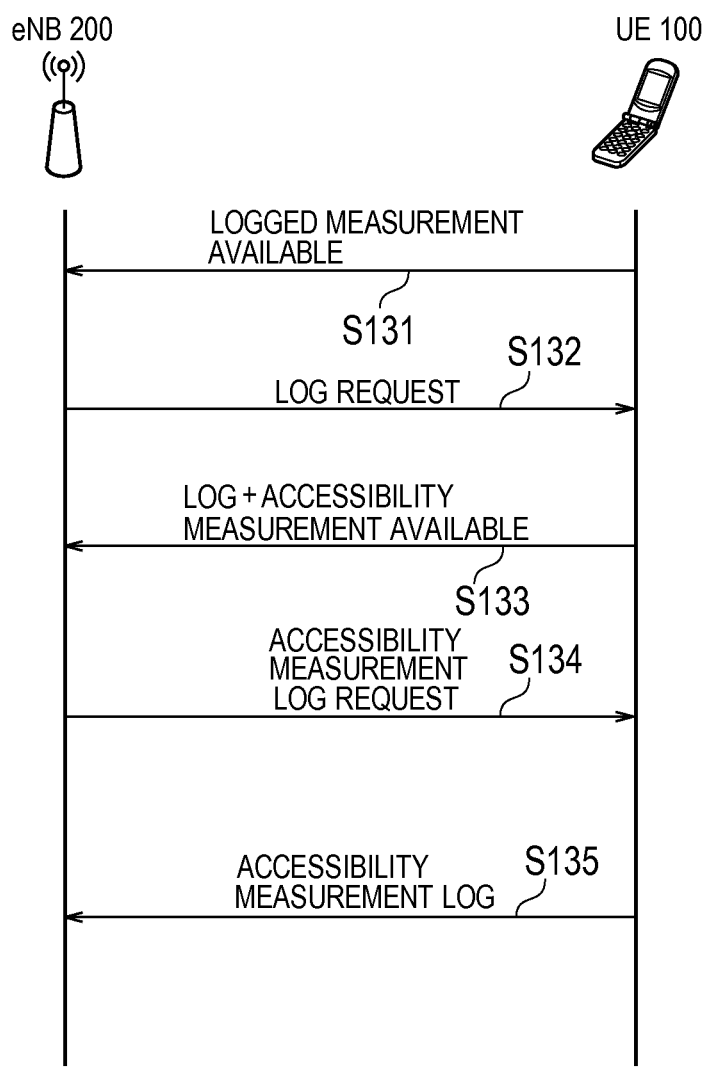
FIG. 12 is a sequence diagram of a method 3 of reporting a log according to the embodiment.

FIG. 12 is a sequence diagram of a method 3 of reporting a log according to the present embodiment.

As illustrated in FIG. 12, in step S131, the UE 100 transmits the Availability Indicator indicating that the MDT measurement log is stored to the eNB 200.

In step S132, the eNB 200 transmits the Log Request for requesting the transmission of the log to the UE 100 on the basis of the Availability Indicator from the UE 100.

In step S133, the UE 100 transmits the MDT measurement log to the eNB 200 in response to the Log Request from the eNB 200. At this time, if the connection establishment failure log is stored, the UE 100 transmits the Availability Indicator indicating that the connection establishment failure log is stored together with the MDT measurement log to the eNB 200.

In this way, in this sequence, a trigger (a predetermined trigger) transmitting the Availability Indicator indicating that the connection establishment failure log is stored means an event that the Log Request is received by the UE 100 from the network.

In step S134, the eNB 200 transmits the Log Request requesting the transmission of the connection establishment failure log to the UE 100 on the basis of the Availability Indicator from the UE 100.

In step S135, the UE 100 transmits the connection establishment failure log to the eNB 200 in response to the Log Request from the eNB 200.

In this way, according to the method 3 of reporting a log, it is possible to report the connection establishment failure log by adding some steps to the sequence of reporting the MDT measurement log.

(5) Other Embodiments

It should not be understood that the present invention is limited to the descriptions and drawings constituting a part of this disclosure. From this disclosure, a variety of alternate embodiments, examples, and applicable techniques will become apparent to one skilled in the art.

Figure 13:
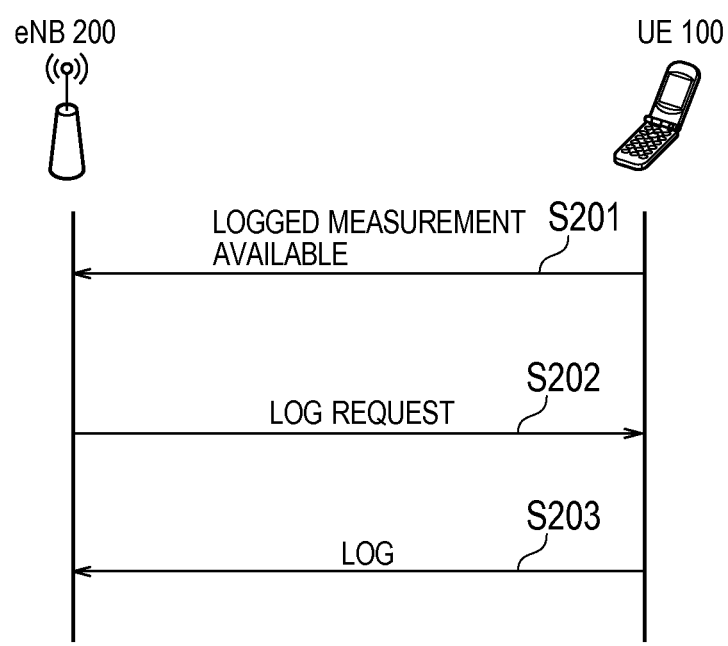
FIG. 13 is a diagram for describing a method of reporting a log according to another embodiment.

In the present embodiment described above, there has been described a case where the memory area is divided into the memory area for the MDT measurement log and the memory area for the connection establishment failure log and the MDT measurement log and the connection establishment failure log are individually transmitted to the network. However, the MDT measurement log and the connection establishment failure log may be stored together, and the MDT measurement log and the connection establishment failure log may be transmitted together. FIG. 13 is a diagram for describing a method of reporting a log according to another embodiment. Here, it is assumed that the UE 100 stores at least one of the MDT measurement log and the connection establishment failure log. As illustrated in FIG. 13, in step S201, when the transmission event of the Availability Indicator in the MDT occurs, the UE 100 transmits the Availability Indicator to the eNB 200. In step S202, the eNB 200 transmits the Log Request for requesting the transmission of the log to the UE 100. In step 5203, the UE 100 transmits the stored log (the MDT measurement log or the connection establishment failure log) to the eNB 200 on the basis of the Log Request received from the eNB 200.

In addition, in the present embodiment described above, although the connection establishment failure log including the reselection reason of the random access resource is generated whenever the random access resource is reselected, only when the timing notifying the random access problem to the upper layer (that is, from the layer 2 (MAC) to the layer 3 (RRC)), that is, the T300 expires, or when the number of the transmission random access preambles (the number of transmissions of the random access preambles) exceeds a threshold value (that is, "preambleTransMax" corresponding to the maximum transmittable number of the random access preambles), the connection establishment failure log including the factor (the reselection reason of the random access resource) causing the random access problem may be generated. When the number of transmissions of the random preambles exceeds the threshold value, information indicating a procedure (for example, 'Random Access Response not received', 'Lost in contention resolution', or 'T300 is expired') at which the number of transmissions of the random access preambles reaches the threshold value may be included in the connection establishment failure log.

The aforementioned embodiment has been described that the UE 100 commonly uses the timer (the timer for elapsed time) for counting the elapsed time until the connection establishment failure log is transmitted from the occurrence time point of the access failure as the timer for counting the time (the log retention time) for retaining the connection establishment failure log.

However, a timer (hereinafter, referred to as a "timer for log retention time") for counting the time for retaining the connection establishment failure log (the log retention time) may be further provided separately from the timer for elapsed time. When the timer for log retention time is further provided, the elapsed time from an occurrence time point of the access failure can be counted by the timer for elapsed time and the time for retaining the connection establishment failure log (the log retention time) can be counted by the timer for log retention time.

For example, when the first access failure occurs, the UE 100 starts both the timer for elapsed time and the timer for log retention time. When the second access failure occurs, the UE 100 stores the timer value (the elapsed time) indicated by the timer for elapsed time and restarts (resets) the timer for log retention time. By the restarting the timer for log retention time, it is possible to extend the time (the log retention time) for retaining the connection establishment failure log along with an occurrence of new access failure.

As the timer for log retention time, the 48-hour timer used in the Logged MDT may be used.

(6) Appendix

As described above, "Logging of failed RRC Connection establishments will be supported for LTE and UMTS, i.e., a log will be created when the RRC connection establishment procedure fails, without any explicitly configuration.

However there are still some FFS issues i.e., "the MDT log should allow to distinguish whether the RACH procedure was not successful or whether T300 expired" and "whether we realize this as a logged MDT report or as a separate procedure (like RLF reports)". Below, the Accessibility measurement will be described while focusing on the logging and reporting.

(Architecture for Accessibility Measurement)

Accessibility measurement log is created when the RRC connection establishment procedure fails. It's assumed there are various causes for RRC connection establishment failure. If the failure is due to network congestion or moving out of coverage, it would be difficult for the UE to quickly reconnect to the E-UTRA network. Therefore, we think the current Logged MDT report architecture is also feasible for Accessibility measurement and allows enough flexibility for log retrieval.

Proposal 1: A logged MDT report architecture should be reused for Accessibility measurement.

If the Proposal 1 is agreed, the issue of logging and log indication should also be discussed. If the UE has an existing Logged MDT configured, it is necessary to decide whether the Accessibility log should be combined with the log from Logged MDT or whether it should be a separate log. Since the Accessibility log is created without explicit configuration, it would be too difficult for the network to sort out MDT measurements from accessibility info, and there are no clear advantages for having a combined log. With one combined log it would be more difficult for the UE to indicate to the network the contents of the log. To allow for more flexibility at the network, the UE should send a separate indicator to inform the network of the availability of the Accessibility log.

Currently the UE is allowed to stop the logging autonomously in case the log volume exceeds the suitable UE memory. If the Accessibility log is combined with the log from the Logged MDT for idle mode measurements, the Accessibility measurement may also be stopped. However, we don't think the accessibility measurement and logging should be stopped just because the logged MDT is stopped due to memory resource constraint since Accessibility measurement log is quite important for mitigating Accessibility problem. The most feasible solution therefore is to have separate logs for the accessibility measurement and Logged MDT measurement.

Proposal 2: The accessibility measurement and logging should continue even if the logged MDT is stopped due to memory resource constraint.

Proposal 3: The Accessibility measurement result should be logged separately from the other logs; and the UE should be allowed to send a new indicator, separate from the Logged Availability indicator, when Accessibility log is available.

The memory size to reserve for storing the Accessibility log should be specified.

(Logging Unit of the Accessibility Measurement)

Another open issue concerns the need for the Accessibility log to distinguish between RACH procedure failure and T300 expiry. To fully evaluate the Accessibility problem, the location, time of problem occurrence and procedural issues, should all be known to the NW/RNC/eNB since the optimization process may be different depending on the cause of the failure. The cause of the Accessibility failure should be stored when the Accessibility failure occurs.

In the current specification, the UE can reselect random access resource when "If no Random Access Response is received within the RA Response window, or if none of all received Random Access Responses contains a Random Access Preamble identifier corresponding to the transmitted Random Access Preamble" and "if the Contention Resolution is considered not successful". Therefore it's beneficial to the network if the RA failure attempt is logged for each selected RA Preamble.

Proposal 4: The RA failure attempt should be logged for each selected RA Preamble.

(Contents of Accessibility Measurement Log)

The collection of information already available at the network using the current specification should be excluded from measurements. Logging and reporting of information related to the failed random access attempts are useful; however, measurements of successful access attempts are not essential and should not be logged and reported.

Cell Identification of RA attempts, number of RACH preambles transmitted and radio measurements (i.e., Cell measurements that are available at the occurrence of the trigger) are useful for optimization and should be logged by UE. The time of the failed access attempts, mobility state information and the selected preamble group may also be of interest for further analysis. Location information is also important but we think the GNSS location information should not be required for accessibility measurement. There may not be enough time to prime the GNSS receiver to obtain a valid location fix since RACH transmission isn't a periodical event. If the detailed location information is mandated, the UE may not be able to perform an access attempt until GNSS location measurement is available or the UE may have to leave the GNSS receiver on at all times.

Since RAN2 has agreed to allow the use E-Cell ID as one of the valid mechanism for Requested Location Information. E-Cell ID could be considered as the baseline location measurement mechanism for the Accessibility failure case if location information is critical.

Proposal 5: The Accessibility log should include the Cell Identification of RA attempts, number of RACH preambles transmitted, radio measurement at the occurrence of RA failures and the reason for new RA Resource selection (e.g., 'Random Access Response not received', 'Lost in contention resolution', 'T300 is expired').

Proposal 6: E-Cell ID should be the considered as the baseline location measurement mechanism for Accessibility failure case. Valid GNSS location information and/or UE speed information reception point may also be included in the log. FFS whether the GNSS location information is valid is judged based on RAR reception point.

(Consideration of Time Related Issues)

Whether time stamp of each problem occurrence should be added to the accessibility log will be considered. Currently, the UE's time stamp is based on the availability of absolute time provided at MDT configuration. However, this is only feasible if the UE is configured with Logged MDT. Accessibility measurement is not explicitly configured and the UE may not have the absolute time information. This may not be a big issue if the time between the occurrence of the accessibility problem and the reporting of the problem is completed is relatively short. However, there is no guarantee that the time difference will be short. Due to the accessibility problem it is actually more likely that this time difference will be long. Therefore a new mechanism is needed. One feasible option is to introduce a new timer and stored its timer's value in case Accessibility problem occurs.

Figure 14:
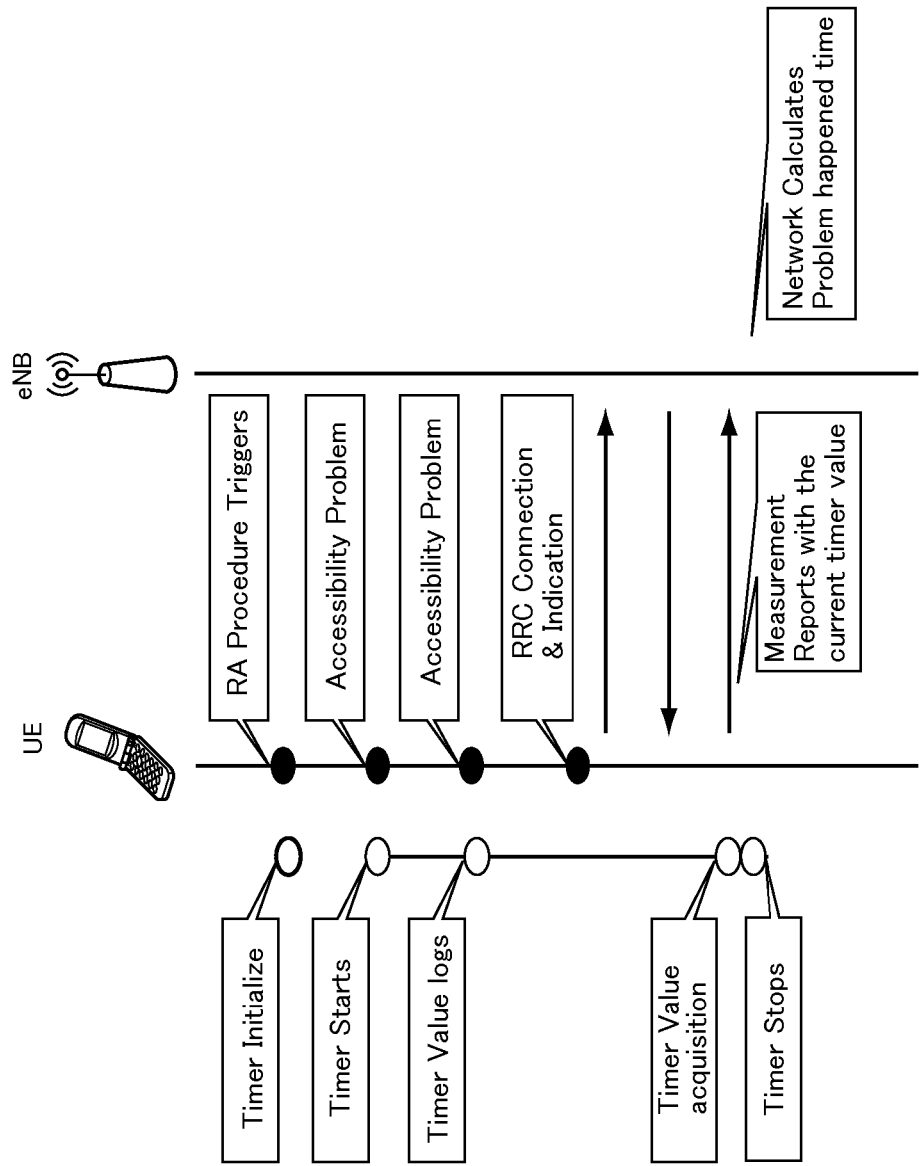
FIG. 14 is a diagram for describing an example of time stamp without the need for absolute time.
Figure 15:
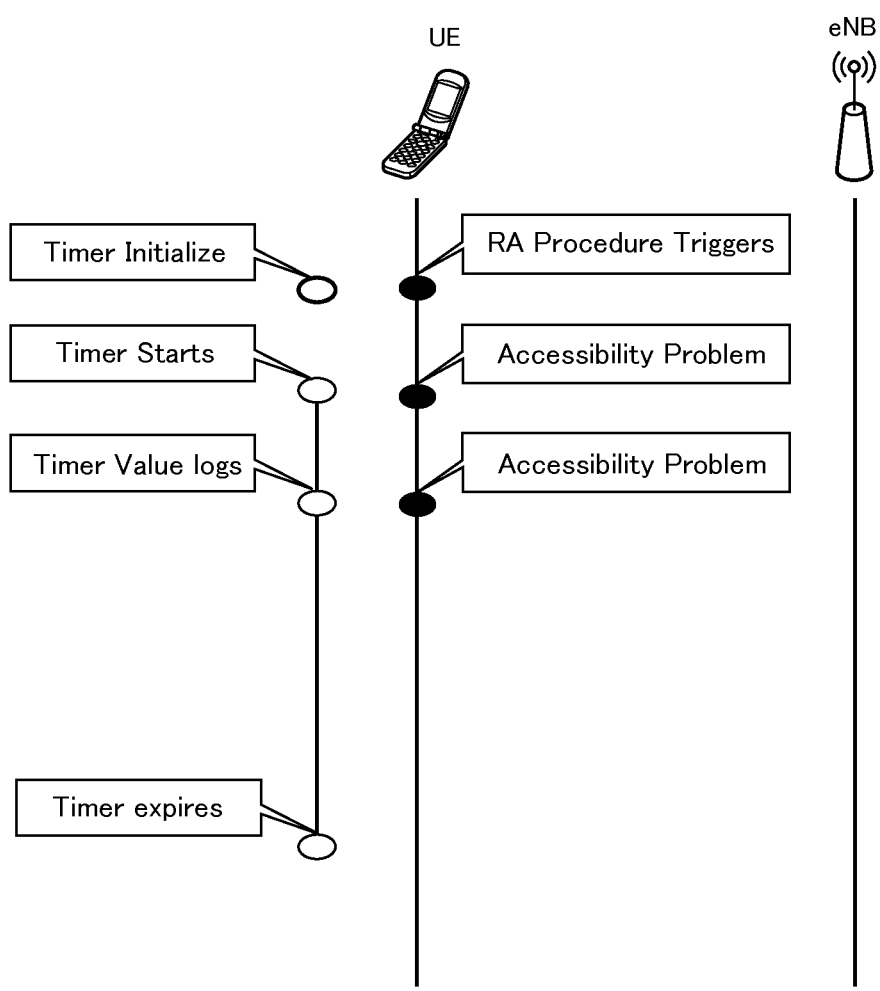
FIG. 15 is a diagram for describing an example of Timer expired case.

FIG. 14 is an example of a solution for time stamp without the need for absolute time. FIG. 15 is an example of a solution for time stamp without the need for absolute time (Timer expired case). As illustrated in FIG. 14, this example uses a countdown timer with a fixed timer value. It is also assumed that both the eNB and the UE know the timer value. This timer can also be reused as a log retention timer. As illustrated in FIG. 15, at timer expiry, the UE should consider this Accessibility log as invalid and remove it from memory.

In a case where the other option for the coordination with time information is selected, we should define some other log retention requirements i.e., there is no requirement to store non-retrieved data beyond 48 hours, or there is no requirement to store non-retrieved data after the 48 hour timer which is counting for the other log retention time is expired (if 48 hour timer is already running).

Proposal 7: The need for time stamp and log retention timer for the accessibility log should be considered.

The entire contents of U.S. provisional application No. 61/645,969 (filed on May 11, 2012) are incorporated herein by reference.

INDUSTRIAL APPLICABILITY

As described above, the present invention is useful for mobile communication fields.

The invention claimed is:

1. A communication control method performed at a user terminal, the method comprising:
   detecting a failure of a radio resource control (RRC) connection establishment procedure with a network, wherein the RRC connection establishment procedure is a procedure performed by the user terminal in an RRC idle state;
   storing a connection establishment failure log related to the failure of RRC connection establishment procedure;
   timing, at the user terminal, an elapsed time from an occurrence time point of the failure of RRC connection establishment procedure; and
   transmitting, from the user terminal to the network, the connection establishment failure log including elapsed time information indicating the elapsed time.

2. The communication control method according to claim 1, further comprising:
   starting a timer in response to the occurrence of the failure of RRC connection establishment procedure, by the user terminal,
   wherein the user terminal transmits information indicating a value of the timer at a time point of transmitting the connection establishment failure log, as the elapsed time information.

3. The communication control method according to claim 2, further comprising:
   retaining the connection establishment failure log without deleting until the value of the timer exceeds a threshold value after starting the timer, by the user terminal.

4. The communication control method according to claim 1, further comprising:
   storing a minimization of drive test (MDT) measurement log different from the connection establishment failure log, the MDT measurement log related to measurement results of the user terminal in the RRC idle state;
   transmitting, from the user terminal to the network, a first indicator indicating that user terminal has the connection establishment failure log; and
   transmitting, from the user terminal to the network, a second indicator indicating that user terminal has the MDT measurement log.

5. A user terminal comprising:
   a controller containing at least one processor, and configured to
   detect a failure of a radio resource control (RRC) connection establishment procedure with a network, wherein the RRC connection establishment procedure is a procedure performed by the user terminal in an RRC idle state;
   store a connection establishment failure log related to the failure of RRC connection establishment procedure;
   time, at the user terminal, an elapsed time from an occurrence time point of the failure of RRC connection establishment procedure; and
   transmit, to the network, the connection establishment failure log including elapsed time information indicating the elapsed time.

6. An apparatus comprising:
   at least one processor configured to cause a user terminal to:
   detect a failure of a radio resource control (RRC) connection establishment procedure with a network, wherein the RRC connection establishment procedure is a procedure performed by the user terminal in an RRC idle state;
   store a connection establishment failure log related to the failure of RRC connection establishment procedure;

time, at the user terminal, an elapsed time from an occurrence time point of the failure of RRC connection establishment procedure; and transmit, to the network, the connection establishment failure log including elapsed time information indicating the elapsed time.

\* \* \* \* \*